INVENTOR.
CARL STEINER

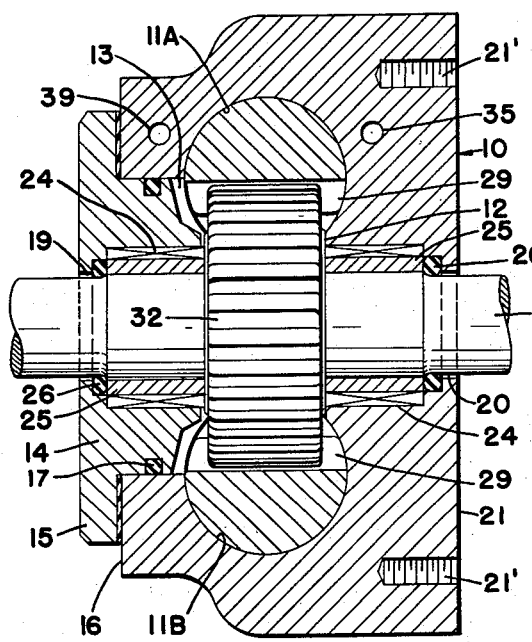

United States Patent Office 2,844,127
Patented July 22, 1958

2,844,127

FLUID PRESSURE TORQUE CONVERTER

Carl Steiner, Orrville, Ohio

Application March 3, 1955, Serial No. 491,851

8 Claims. (Cl. 121—120)

The invention relates generally to fluid pressure motors and more particularly to a motor for converting linear motion into rotary motion by the application of balanced torque to a rotary shaft.

United States patent application Serial Number 658,631, filed May 13, 1957, by Carl Steiner for a Fluid Pressure Torque Converter is a co-pending divisional application of this application. The divisional case spells out many of the concepts of this invention as applied to torque converters generally, while this application is directed to a device having two double ended pistons and balanced torque applied to a driven shaft.

In fluid pressure systems there are many applications where it is desirable to utilize the motion of a reciprocating piston for rotating a shaft or other member about its own axis. Certain prior constructions have included a rack operatively connected to the reciprocating piston and meshing with a gear segment on the rotary shaft, but such a construction is unbalanced and applies torque only on one side of the shaft.

It has been proposed to provide two racks meshing with opposite sides of a pinion on the rotary shaft, but in all of such constructions of which I am aware, pressure is applied to one rack for operating the rotary shaft in one direction and to the other rack for operating the shaft in the opposite direction. Moreover, such constructions have been of complicated construction and have involved difficulties in keeping the meshing racks and pinion properly lubricated.

It is an object of the present invention to provide an improved and compact fluid pressure motor having reciprocating pistons for rotating a shaft in either direction with balanced torque.

Another object is to provide an improved fluid pressure motor having reciprocating pistons driving a pinion completely enclosed and sealed in a lubricant bath.

A further object is to provide the pistons with novel means for wiping and lubricating the cylinders in which they reciprocate.

Another object is to provide a fluid pressure motor embodying a novel conduit system for supplying and exhausting fluid to and from the opposite ends of both cylinders simultaneously.

A further object is to provide an improved construction in which the thrust on the pistons is transmitted to their cylinders throughout the full length of said pistons.

A still further object is to provide an improved construction which is easily disassembled for inspection, cleaning and repair.

Yet another object of this invention is to provide a new and novel two-way piston having O-rings at either end to serve a dual function so that one ring serves as a sealing ring and the other as a wiping ring when the piston is moved in one direction and that the one ring serves as a wiping ring and the other ring as a sealing ring when the piston is moved in the other direction. This objective may be achieved by so locating the O-rings that when they are exposed to fluid under pressure they assume a position of tight sealing contact but in the absence of such fluid pressure they assume a position of loose wiping contact.

Still another object of the invention is to provide a new and novel lubrication chamber which is of varying contour since a portion of the chamber is defined by a central portion of the piston, thereby providing a self-agitating lubrication chamber.

Still another object of the invention is to provide a new and novel unitary piston construction which will withstand extremely high pressures and other forces by providing a piston with an integrally formed rack and an elongated surface which serves as an end thrust bearing.

A further object of the invention is to provide a novel and improved double piston torque converter device in which a quantity of lubricant fills a lubricant chamber to serve a dual function as a lubricant for relatively moving parts and as a pressure transmitting media in order that activation forces applied against one of the sealing rings will be transmitted to the other rings thereby causing the other rings to serve as back-up rings.

These and other objects are accomplished by the parts, combinations and arrangements comprising the present invention, a preferred embodiment of which is shown by way of example in the accompanying drawings and described in detail herein. Various modifications and changes in details of construction are included in the scope of the invention as defined in the appended claims. The improved motor may be described in general terms as comprising a housing enclosing two pistons reciprocable in parallel cylinders which are connected intermediate their ends to a pinion chamber enclosing a pinion on a rotary shaft extending between the cylinders, the pistons having intermediate rack portions meshing with said pinion, and conduits in the housing for selectively supplying and exhausting fluid to and from the diagonally opposite ends of the pistons simultaneously, whereby the pistons are forced simultaneously in opposite directions to drive the piston in one direction or the opposite direction.

In the drawings:

Fig. 3 is an enlarged transverse sectional view on line 3—3, Fig. 1.

Fig. 4 is an enlarged transverse sectional view on line 4—4, Fig. 1.

Fig. 5 is an enlarged end elevation as on line 5—5, Fig. 1.

Fig. 6 is a fragmentary sectional view on line 6—6, Fig. 5.

Figures 1, 2:
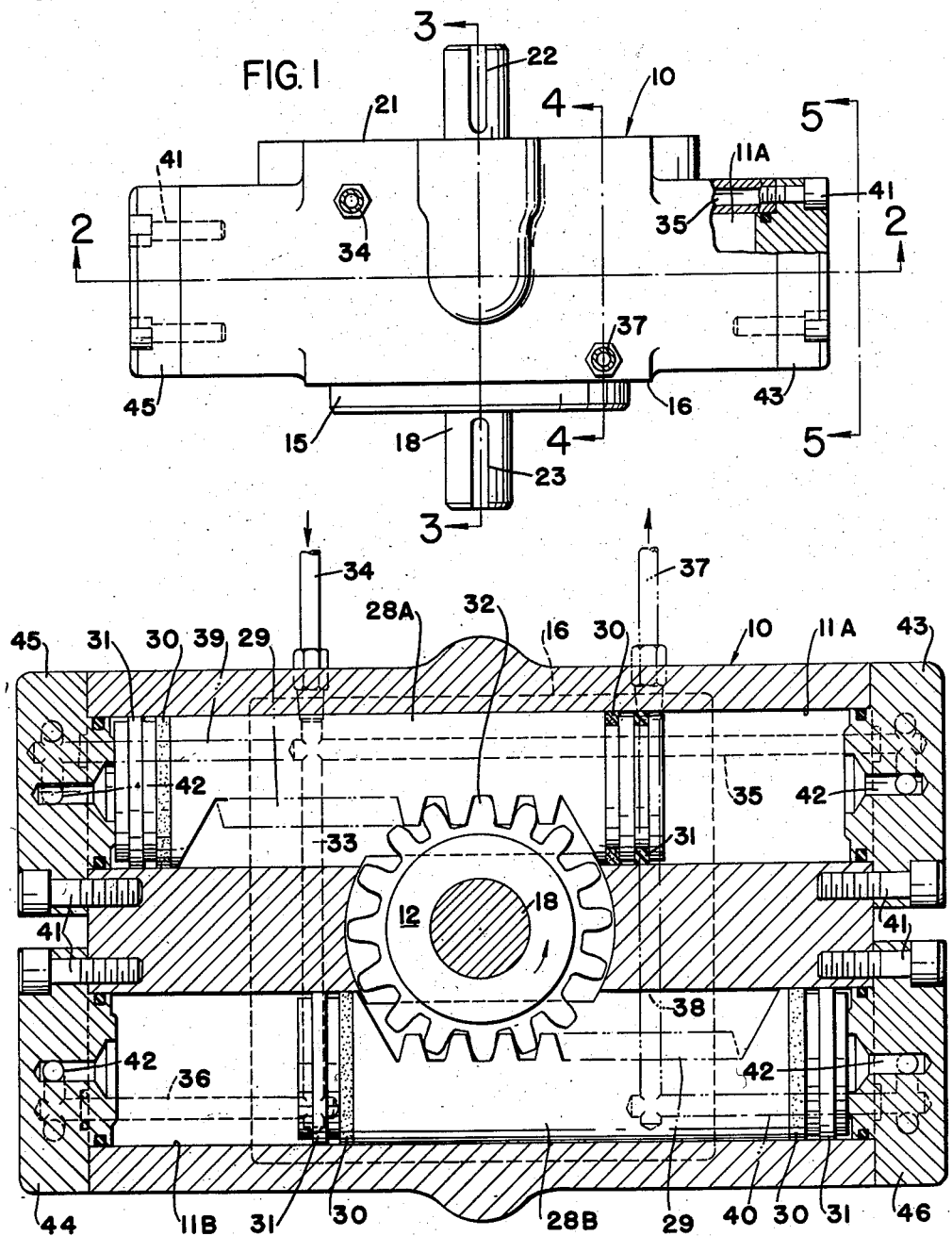
Fig. 1 is a side elevation of the improved motor, partly broken away and in section.
Fig. 2 is a plan sectional view taken on line 2—2, Fig. 1.

The housing block 10 preferably has two parallel cylindrical bores or piston chambers 11A and 11B in side-by-side relation extending longitudinally through the block from one end to the other. A central pinion chamber 12 communicates with the intermediate portions of the bores 11A and 11B and has a cylindrical opening 13 extending out through one face of the block, as shown in Fig. 3. This opening 13 is closed by a closure plate 14 having an annular flange 15 secured to the rectangular outer face 16 of the housing by suitable socket head cap screws (not shown). The plate 14 has an O-ring groove carrying an O-ring 17 for sealing against the surface of the opening 13 to retain lubricant in the chamber 12.

A pinion shaft 18 extends through the chamber 12 and through aligned bores 19 and 20 in the closure plate 14 and housing, respectively. The portions of the shaft projecting beyond the outer face 16 and inner face 21 of the housing block are preferably splined, as shown at 22 and 23 in Fig. 1, for connection with other shafts or members to be driven by the motor. The face 21 may be machined as desired for mounting on a suitable support, and may have tapped holes 21' for that purpose. As shown in Fig. 3, the shaft is preferably journaled in the closure plate 14 and housing by means of anti-friction bearings indicated at 24 which roll against bushings 25 on the shaft. Sealing rings 26 are provided around the shaft at the outer ends of the bushings to seal out dust and seal in the lubricant from the pinion chamber while allowing it to lubricate the bearings 24.

Pistons 28A and 28B are slidably mounted in the cylinders 11A and 11B, respectively, and the pistons are provided between their ends with rack portions 29 facing toward each other on the inner sides of the pistons. Beyond the rack portions 29 both ends of the pistons are provided with inner felt wiper rings 30 and with outer sealing O-rings 31, beyond which the diameter of the piston is reduced to provide clearance from the cylinder walls.

A spur pinion 32 is located in the chamber 12 and may be keyed on or integral with the shaft 18. The pinion extends laterally into the cylinders 11A and 11B and meshes with the rack portions 29 of the pistons 28A and 28B. The teeth of the rack and pinions are designed to have a 14½° pressure angle so that the side thrust on the pistons is minimized. Moreover, the side thrust is distributed throughout the full lengths of the pistons. End thrust on the shaft 18 is taken by faces of the pinion bearings 24 against the adjacent surfaces of the housing and closure plate 14, or if desired tapered roller bearings may be used as the bearings 24 to take care of end thrust.

The sealing rings 31 on the pistons seal in the lubricant in the pinion chamber 12 so that the pinion and rack portions can operate in a lubricant bath. As the pistons reciprocate a film of the lubricant is constantly spread over the surfaces of the cylinders by the wiper rings 30 without escaping beyond the limits defined by the rings 31. The sealing rings 31 always move ahead of the wiper rings to wipe dust or other foreign material from the cylinder walls, and the reduced or relieved outer ends of the pistons allow the O-rings 31 to wipe away foreign matter without scoring the cylinder walls.

As has previously been indicated, the O-rings serve a dual function. This can best be understood by referring to Figure 2. As the top piston moves to the left pressure is present in the right-hand end of the piston chamber 11A. This forces the right-hand O-ring 31 into close surface contact with the inner walls of the housing 10 which define the piston chamber 11A. This is a tight sealing action which prevents the migration of fluid from the pressure area into the lubricating reservoir. At the same time the left-hand O-ring 31 is in a more normal sliding contact with the surfaces of the chamber 11A. By this it is meant that though the O-ring is in sufficiently close contact with the walls of the chamber to prevent migration of lubricant into the chamber or actuating fluid in the opposite direction, the contact is nonetheless under less pressure than the right-hand O-ring because of the reduced fluid pressure at the left-hand end. With this condition of reduced pressure the O-ring serves its function of wiping the cylinder walls to clear any dirt or other foreign particles which may have been present in the actuating fluid used to drive the piston to the right. When the direction of travel is reversed and fluid under pressure is introduced at the left to drive the piston to the right, the function of the O-rings is reversed. Thus, the O-rings can be referred to as sealing and wiping rings.

Another of the outstanding advantages of the invention resides in the fact that the O-rings serve yet another function, and the lubricant filling the lubricant reservoir serves a dual function. Since the lubricant substantially fills the lubricant reservoir and since the lubricant will be a noncompressible material, any leakage of the power transmitting media past one of the O-ring seals when it is serving its function as a sealing or pressure ring, will apply pressure to the lubricant. This pressure is transmitted by the lubricant to the remaining seals, and the remaining rings or seals then serve an additional or third function as back-up rings. Pressure applied against one of the remaining or back-up seals by the lubricant, causes the seal to shift in the direction opposite from shifting from power transmitting pressure thereby pressing a fresh unworn portion of the O-ring surface into intimate engagement with the piston chamber walls. This action is believed to contribute materially to the long life characteristics and outstanding stability characteristics of this device.

The passageways for conducting pressure fluid such as oil selectively to and from opposite ends of the two cylinders include a passageway 33 connected to a fluid pipe 34 designated as a supply pipe in Fig. 2. The passageway 33 extends transversely of the cylinders 11A and 11B on one side thereof, and connects with a longitudinal passageway 35 running to one end of cylinder 11A, and connects with a longitudinal passageway 36 running to the opposite end of cylinder 11B. Similarly, exhaust pipe 37 is connected to a transverse passageway 38 (shown in chain lines in Fig. 2) on the other side of the two cylinders. The passageway 38 is connected with a longitudinal passageway 39 running to the other end of the cylinder 11A, and with a longitudinal passageway 40 running to the opposite end of the cylinder 11B.

Circular caps 43, 44, 45, 46 are attached to the ends of both of the cylinders 11A, 11B by socket head screws 41. The caps have radially disposed, U-shaped passageways 42 for connecting the ends of the longitudinal fluid passageways with the ends of the cylinders, as best shown in Fig. 5. Thus, the cap 43 has a passageway 42 connecting the outer end of passageway 35 with one end of the cylinder 11A. The cap 44 has a passageway 42 connecting the outer end of the passageway 36 with the opposite end of the cylinder 11B. The cap 45 has a passageway 42 connecting the outer end of the passageway 39 with the other end of the cylinder 11A. The cap 46 has a passageway 42 connecting the outer end of the passageway 40 with the other end of the cylinder 11B.

Referring to Fig. 2, if fluid under pressure is introduced through the pipe 34 it will be conducted through the passageway 35 and the cap 43 into the right end of the cylinder 11A, and simultaneously through the passageway 36 and the cap 44 into the left end of the cylinder 11B. Fluid so introduced will cause the pistons 28A and 28B to move left and right respectively, and rotate the pinion 32 counterclockwise with an equal balanced force applied to opposite sides of the pinion. At the same time, fluid will be exhausted from the left end of the cylinder 11A through the cap 45 and the passageways 39 and 38 to the exhaust pipe 37, and from the right end of the cylinder 11B through the cap 46 and the passageways 40 and 38 to the exhaust pipe 37.

When it is desired to rotate the pinion 32 clockwise, the flow through the pipes 34 and 37 is reversed by means of a suitable multi-way valve connected thereto, so that 37 becomes the supply pipe and 34 becomes the exhaust pipe. The pistons 28A and 28B will be simultaneously reciprocated in opposite directions to turn the pinion clockwise with balanced torque. The total amount of rotation of the pinion is predetermined by the length of the rack portions 29, but the pinion can be held at intermediate positions by turning the multi-way control valve to neutral.

Due to the arrangement of the pistons and their sealing rings, the pistons can be operated at high pressures without affecting the oil bath in which the pinion and meshing racks operate, so that the pressure fluid can be oil, water or gas under high pressures.

The improved torque converter motor is contained in a relatively small and compact housing with the shaft ends being the only projecting portions. The unit is easily assembled and dis-assembled, and the cylinders are easily accessible, merely by removing the end caps, for cleaning and repair or replacement of the O-ring seals.

What is claimed is:

1. A torque converter for converting linear to rotary motion comprising, a housing having first and second spaced parallel piston chambers, the housing also having a gear chamber interposed between the piston chambers, said chambers being interconnected, a shaft journalled in the housing and having a gear portion in the gear chamber, a first piston carried in the first chamber, a second piston carried in the second chamber, said piston chambers and pistons each having first and second ends, said pistons each having a rack formed intermediate the first and second ends, the racks each being in engagement with the gear, said converter having first and second fluid passages, said first fluid passage being connected to said first piston chamber first end and said second piston chamber second end, said second fluid passage being connected to said first piston chamber second end and said second piston chamber first end, said piston chambers each having a smooth surface, seals carried by each of the pistons at their first and second ends, the seals each being in slidable engagement with one of the piston chamber surfaces, and caps to close the ends of the piston chambers, said gear chamber and said first and second piston chambers intermediate said seals forming a lubricant reservoir, a quantity of lubricant filling the reservoir, said reservoir having a varying contour when said pistons reciprocate to provide self-agitation for the lubricant contained therein, the lubricant being a back-up pressure transmitting fluid to conduct back-up pressure from each seal to the other seals, whereby to provide a device in which fluid under pressure introduced through the first fluid passage will drive the first piston toward the first piston chamber second end and simultaneously drive the second piston toward the second piston chamber first end to cause the racks to drive the gear rotatively in one direction with an equal torque load application by each of the racks on opposite sides of the gear, and whereby to provide a device in which fluid under pressure introduced through the second fluid passage will cause the pistons and the gear to move in the opposite direction under balanced torque conditions.

2. A torque converter for converting linear to rotary motion comprising, a housing having first and second spaced parallel piston chambers, the housing also having a gear chamber interposed between the piston chambers said chambers being interconnected, a shaft journalled in the housing and having a gear portion in the gear chamber, a first piston carried in the first chamber, a second piston carried in the second chamber, said piston chambers and pistons each having first and second ends, said pistons each having a rack formed intermediate the first and second ends, the racks each being in engagement with the gear, said converter having first and second fluid passages, said first fluid passage being connected to said first piston chamber first end and said second piston chamber second end, said second fluid passage being connected to said first piston chamber second end and said second piston chamber first end, said piston chambers each having a smooth surface, seals carried by each of the pistons at their first and second ends, the seals each being in slidable engagement with one of the piston chamber surfaces, said first piston having a bearing surface formed on the opposite side from said first piston rack to interact with said first chamber surface to absorb side thrust imparted to the first piston by interaction of the first rack and said gear, said second piston having a bearing surface formed on the opposite side from said second piston rack to interact with said second chamber surface to absorb side thrust imparted to the second piston by interaction of the second rack and said gear, said gear chamber and varying portions of said first and second piston chambers between said seals forming a self agitating lubricant reservoir, and a quantity of lubricant filling said reservoir to lubricate the racks, gear, and bearings and to form a pressure transmitting fluid capable of transmitting pressure from one of said seals to the other of said seals, and caps to close the ends of the piston chambers, whereby to provide a device in which fluid under pressure introduced through the first fluid passage will drive the first piston toward the first piston chamber second end and simultaneously drive the second piston toward the second piston chamber first end to cause the racks to drive the gear rotatively in one direction with an equal torque load application by each of the racks on opposite sides of the gear, and whereby to provide a device in which fluid under pressure introduced through the second fluid passage will cause the pistons and the gear to move in the opposite direction under balanced torque conditions.

3. A torque converter for converting linear to rotary motion comprising, a housing having first and second spaced parallel piston chambers, the housing also having a gear chamber interposed between the piston chambers, said chambers being interconnected, a shaft journalled in the housing and having a gear portion in the gear chamber, a first piston carried in the first chamber, a second piston carried in the second chamber, said piston chambers and pistons each having first and second ends, said pistons each having a rack formed intermediate the first and second ends, the racks each being in engagement with the gear, said converter having first and second fluid passages, said first fluid passage being connected to said first piston chamber first end and said second piston chamber second end, said second fluid passage being connected to said first piston chamber second end and said second piston chamber first end, said piston chambers each having a smooth surface, a first O-ring carried by the first piston at its first end, a second O-ring carried by said first piston at its second end, a third O-ring carried by said second piston at its first end, a fourth O-ring carried by said second piston at its second end, said O-rings each being in slidable contact with one of said chamber surfaces, said first and third O-rings being seals and said second and fourth O-rings being wipers and back-ups when fluid under pressure is introduced into said chambers through said first fluid passage, said second and fourth O-rings being seals and said first and third O-rings being wipers and back-ups when fluid under pressure is introduced through said second fluid passage, said gear chamber and said first and second piston chambers intermediate said O-rings forming a lubricating reservoir, a lubricant filling said reservoir and being a pressure transmitting fluid to transmit pressure from the pressure rings to the back-up rings, said reservoir having a varying contour when said pistons reciprocate to provide self-agitation for the lubricant contained therein, and caps to close the ends of the piston chambers, whereby to provide a device in which fluid under pressure introduced through the first fluid passage will drive the first piston toward the first piston chamber second end and simultaneously drive the second piston toward the second piston chamber first end to cause the racks to drive the gear rotatively in one direction with an equal torque load application by each of the racks on opposite sides of the gear, and whereby to provide a device in which fluid under pressure introduced through the second fluid passage will cause the pistons and the gear to move in the opposite direction under balanced torque conditions.

4. A torque converter comprising, a housing having first, second and third interconnected chambers, a shaft journalled in the housing, a gear carried by the shaft and disposed in the first chamber, said second and third chambers each having first and second ends and each also having a cylindrical surface, a first piston carried in said second chamber, a second piston carried in the third chamber, the pistons each having first and second ends, a first O-ring carried by the first piston at its first end, a second O-ring carried by the first piston at its second end, a third O-ring carried by the second piston at its first end, a fourth O-ring carried by the second piston at its second end, the first and second O-rings being in sliding contact with said second chamber surface, the third and fourth O-rings being in sliding contact with said third chamber surface, a first rack intermediate the first and second O-rings to reciprocate with said first piston, a second rack intermediate the third and fourth O-rings to reciprocate with the second piston, the racks each being intermeshed with the gear, said pistons each having a cylindrically contoured bearing surface of substantially semi-circular cross section formed opposite the associated rack, said first piston bearing surface cooperating with said second chamber surface to form a bearing to absorb thrust transmitted between said first rack and said gear, said second piston bearing surface cooperating with said third chamber surface to absorb thrust transmitted between said second rack and gear, a first fluid passage communicating with said second chamber first end and said third chamber second end, a second fluid passage communicating with said second chamber second end and said third chamber first end, said passages being for selective conduction of fluid under pressure to cause said pistons to reciprocate in opposite directions, said first chamber and varying portions of said second and third chambers intermediate the O-rings being a lubrication chamber for containment of a gear lubricant, and a quantity of lubricant filling said lubrication chamber to lubricate the racks, bearings, and gear and to form a pressure transmitting fluid capable of transmitting pressure from one of said O-rings to the other of said O-rings, whereby to provide a device in which a lubricant is constantly agitated when the device is in operation and in which the lubricant serves the dual function of lubricating the bearing, the rack and gear and transmitting leakage pressure from seepage past one O-ring to the other O-rings to cause said other O-rings to serve as backups and thereby inhibit leakage and fluid migration.

5. A torque converter comprising, a housing having first and second piston chambers and a gear chamber, a first piston carried in the first chamber, a second piston carried in the second chamber, a shaft journalled in the housing, the shaft having a gear formed thereon, the gear being disposed in the gear chamber, the pistons and the piston chambers each having first and second ends, first, second, third, and fourth combination sealing, wiping, and back-up rings, the first ring being carried by the first piston at its first end, the second ring being carried by the first piston at its second end, the third ring being carried by its second piston at its first end, the fourth ring being carried by the second piston at its second end, the first piston having a rack formed between the first and second rings, the second piston having a rack formed between the third and fourth rings, the racks being in engagement with the gear, said housing being closed and having first and second fluid passages formed therein, the first fluid passage being in communication with the first piston chamber first end and the second piston chamber second end, the second fluid passage being in communication with the first piston chamber second end and the second piston chamber first end, said piston chambers having smooth walls, said first piston being formed on the side opposite the rack to conform closely to the first piston wall, said first piston and first piston wall forming a first bearing to absorb lateral thrust of the interaction of the rack and gear, said second piston being formed on the side opposite the rack to conform closely to said piston chamber wall, and said second piston and said second piston wall forming a second bearing to absorb lateral thrust of the interaction of the rack and gear, said gear chamber and varying portions of said first and second piston chambers between said rings forming a self agitating lubricant reservoir, and a quantity of lubricant filling said reservoir to lubricate the racks, gear, and bearings and to form a pressure transmitting fluid capable of transmitting pressure from one of said rings to the other of said rings.

6. A torque converter comprising, a housing having first and second piston chambers and a gear chamber, a first piston carried in the first chamber, a second piston carried in the second chamber, a shaft journalled in the housing, the shaft having a gear formed thereon, the gear being disposed in the gear chamber, the pistons and the piston chambers each having first and second ends, first, second, third, and fourth combination sealing, wiping, and back-up rings, the first ring being carried by the first piston at its first end, the second ring being carried by the first piston at its second end, the third ring being carried by the second piston at its first end, the fourth ring being carried by the second piston at its second end, the first piston having a rack formed between the first and second rings, the second piston having a rack formed between the third and fourth rings, the racks being in engagement with the gear, first, second, third, and fourth caps fixed to the housing, the first cap sealing the first piston chamber first end, the second cap sealing the first piston chamber second end, the third cap sealing the second piston chamber first end, the fourth cap sealing the second piston chamber second end, said housing being closed and having first and second fluid passages formed therein, the first fluid passage being in communication with the first piston chamber first end and the second piston chamber second end, the second fluid passage being in communication with the first piston chamber second end and the second piston chamber first end, said piston chambers having smooth walls, the first and third rings being in tight sealing engagement and the second and fourth rings being in loose sealing engagement with the piston chamber walls when fluid under pressure is introduced through the first fluid passage, and the first and third rings being in loose wiping engagement and the second and fourth rings in tight sealing engagement with the walls of the piston chamber when fluid under pressure is introduced through the second fluid passage, and first, second, third, and fourth annular wiping pads, the first pad being carried by the first piston at its first end, the second pad being carried by the first piston at its second end, the third pad being carried by the first piston at its first end, the fourth pad being carried by the second piston at its second end, the first and second pads being between the first and second rings, the third and fourth pads being between the third and fourth rings, said gear chamber and varying portions of said first and second piston chambers between said rings forming a self agitating lubricant reservoir, and a quantity of lubricant filling said reservoir to lubricate the racks, gear, and bearings and to form a pressure transmitting fluid capable of transmitting pressure from one of said rings to the other of said rings.

7. A torque converter comprising, a housing having first and second piston chambers and a gear chamber, a first piston carried in the first chamber, a second piston carried in the second chamber, a shaft journalled in the housing, the shaft having a gear formed thereon, the gear being disposed in the gear chamber, the pistons and the piston chambers each having first and second ends, first, second, third, and fourth combination sealing, wiping, and back-up rings, the first ring being carried by the first piston at its first end, the second ring being carried by the first piston at its second end, the third ring being carried by the second piston at its first end, the fourth ring being carried by the second piston at its second end, the first piston having a rack formed between the first and second rings, the second piston having a rack formed between the third and fourth rings, said gear chamber and varying portions of said piston chambers between said rings forming a self-agitating liquid reservoir, a quantity of lubricant filling the reservoir and capable of transmitting pressure from the pressure rings to the back up rings when the device is in operation, the racks being in engagement with the gear, said housing being closed and having first and second fluid passages formed therein, the first fluid passage being in communication with the first piston chamber first end and the second piston chamber second end, the second fluid passages being in communication with the first piston chamber second end and the second piston chamber first end, said piston chambers having smooth walls, said first piston being formed on the side opposite the rack to conform closely to the first piston wall, said first piston and first piston wall forming a first bearing to absorb lateral thrust of the interaction of the rack and gear, said second piston being formed on the side opposite the rack to conform closely to second piston chamber wall, and said second piston and said second piston wall forming a second bearing to absorb lateral thrust of the interaction of the rack and gear.

8. A torque converter comprising, a housing having first and second piston chambers and a gear chamber, a first piston carried in the first chamber, a second piston carried in the second chamber, a shaft journalled in the housing, the shaft having a gear formed thereon, the gear being disposed in the gear chamber, the pistons and the piston chambers each having first and second ends, first, second, third, and fourth combination sealing, wiping, and back-up rings, the first ring being carried by the first piston at its first end, the second ring being carried by the first piston at its second end, the third ring being carried by the second piston at its first end, the fourth ring being carried by the second piston at its second end, the first piston having a rack formed between the first and second rings, the second piston having a rack formed between the third and fourth rings, said gear chamber and varying portions of said piston chambers between said rings forming a self-agitating liquid reservoir, a quantity of lubricant filling the reservoir and capable of transmitting pressure from the pressure rings to the back-up rings when the device is in operation, the racks being in engagement with the gear, said housing being closed and having first and second fluid passages formed therein, the first fluid passage being in communication with the first piston chamber first end and the second piston chamber second end, the second fluid passages being in communication with the first piston chamber second end and the second piston chamber first end, said piston chambers having smooth walls, said first piston being formed on the side opposite the rack to conform closely to the first piston wall, said first piston and first piston wall forming a first bearing to absorb lateral thrust of the interaction of the rack and gear, said second piston being formed on the side opposite the rack to conform closely to second piston chamber wall, and said second piston and said second piston wall forming a second bearing to absorb lateral thrust of the interaction of the rack and gear, each piston having reduced diameter portions at the first and at the second ends, each reduced diameter portion being between an end of a piston and the adjacent ring, each of the pistons having a groove at each end, the rings being carried in the grooves, the diameter of the reduced diameter portion being greater than the diameter of each of the grooves and less than the diameter of the piston in the portion between the grooves.

References Cited in the file of this patent

UNITED STATES PATENTS

| | | |
|---|---|---|
| 85,656 | Harris | Jan. 5, 1869 |
| 1,196,041 | Smith | Aug. 29, 1916 |
| 1,677,112 | Anderson | July 10, 1928 |
| 2,408,338 | Parsons | Sept. 24, 1946 |
| 2,433,990 | Hardy | Jan. 6, 1948 |
| 2,491,375 | Hardy | Dec. 13, 1949 |
| 2,494,598 | Waring | Jan. 17, 1950 |
| 2,515,037 | Hardy | July 11, 1950 |
| 2,547,175 | Sacchini | Apr. 3, 1951 |
| 2,588,166 | Sacchini | Mar. 4, 1952 |
| 2,598,480 | Wright | May 27, 1952 |
| 2,649,077 | Mehm | Aug. 18, 1953 |

FOREIGN PATENTS

| | | |
|---|---|---|
| 575,647 | Great Britain | Feb. 27, 1946 |
| 141,460 | Australia | June 6, 1951 |